I. MIKEAL.
BALING COMPRESS.
APPLICATION FILED APR. 16, 1913.
1,102,282.
Patented July 7, 1914.
2 SHEETS—SHEET 2.
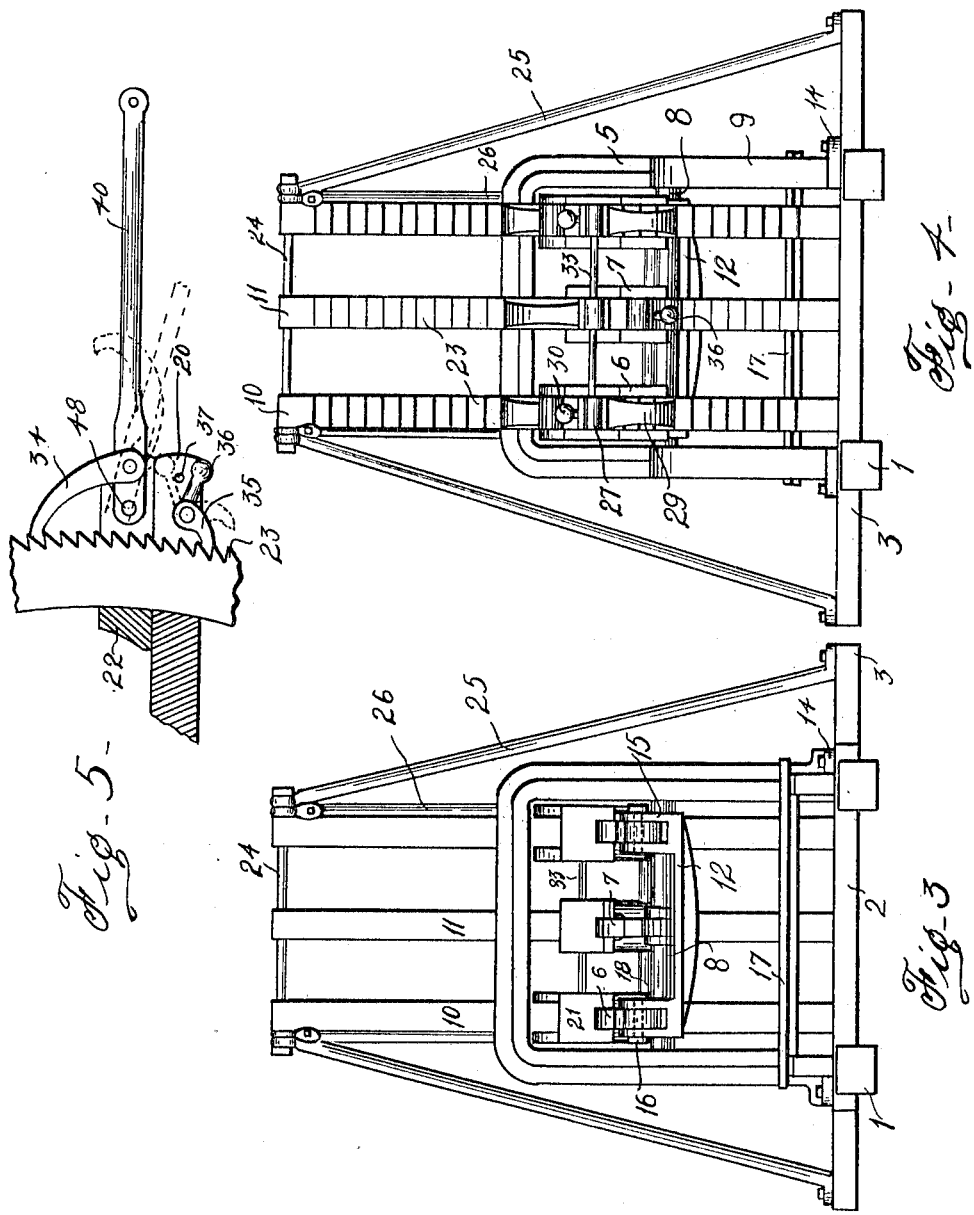
WITNESSES:
INVENTOR
I. Mikeal
BY
ATTORNEYS

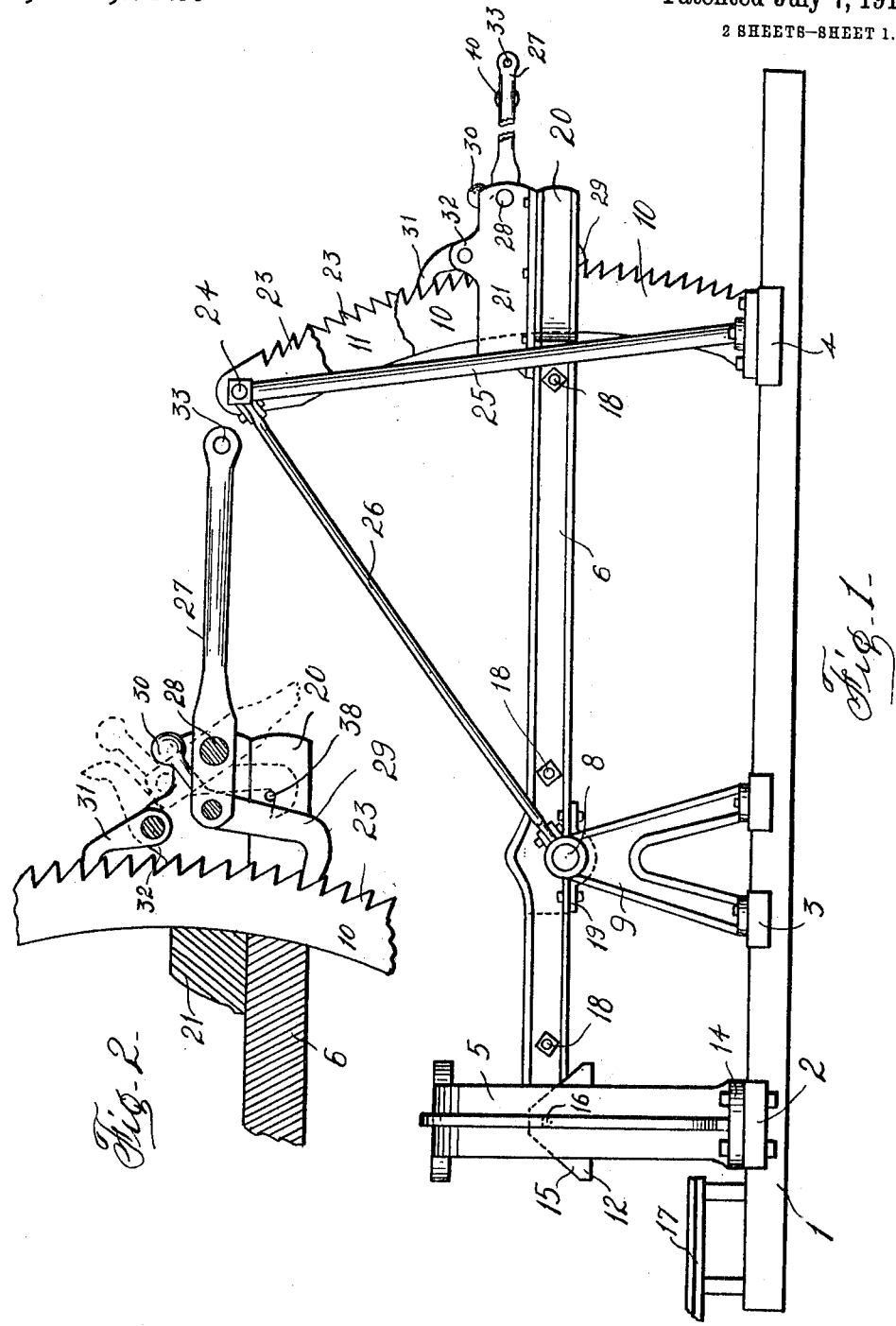

UNITED STATES PATENT OFFICE.

ISHAM MIKEAL, OF MOUNTAIN SPRINGS, TEXAS.

BALING-COMPRESS.

1,102,282.	Specification of Letters Patent.	Patented July 7, 1914.

Application filed April 16, 1913. Serial No. 761,561.

*To all whom it may concern:*

Be it known that I, ISHAM MIKEAL, a citizen of the United States, residing at Mountain Springs, in the county of Cooke and State of Texas, have invented certain new and useful Improvements in Baling-Compresses, of which the following is a specification.

This invention as specified relates to new and useful improvements in baling compresses.

The object of the invention is to provide a compress for pressing bales of cotton and the like and to incorporate in said compress certain novel features of construction.

Another object is to provide a compress comprising a pressing frame within which a bale carrier is disposed, said carrier being swung from the short ends of power levers having their longer or free ends swinging in proximity to racks or their equivalents, whereby a step by step leverage may be applied to the said free ends, and sufficient power exerted at the carrier to compress a bale in the frame.

Another feature resides in the provision of mechanism whereby the usual expensive and complicated compress mechanism may be eliminated, and the compressing be performed entirely by manual power if desired thus reducing the cost of installation, maintenance and operation.

A still further object of the invention is to provide a device of the character described that will be strong, durable, efficient, and simple and comparatively easy to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a side elevation of the compress, Fig. 2 is a detail view of the compressing ratchet construction, Fig. 3 is an end elevation. Fig. 4 is an elevation of the opposite end, and Fig. 5 is a detail of the lever raising mechanism.

In the drawing the numerals 1, 2, 3 and 4 designate longitudinal sills and transverse beams, respectively, said beams being mounted on the sills and a supporting base frame thus being formed. This frame is suitably placed on a proper foundation (not shown) and may be below the surface of the ground if desired.

The invention comprises in a general way, an arched frame or standard 5 mounted on the beam 2, a plurality of power levers 6 and 7 respectively, fulcrumed on a shaft 8 mounted in standards 9 supported on the beams 3, a plurality of vertical segmental rack members 10 and 11 respectively, associated with the free or outer ends of the levers 6 and 7, and suitable mechanism for swinging the free ends of the levers down the rack members whereby a carrier 12 swung from the inner or short ends of the levers is carried upward in the frame 5 with sufficient power to compress a bale of cotton, said bale being supported on the carrier and compressed against the under side of the top of the frame. The mechanism for swinging the levers 6 and 7 may be operated by power supplied manually or mechanically, but by reason of the great leverage attained, a proportionately small amount of power will be required when compared to the amount of power required where the compressing is performed by a piston carrier or power means operating directly on the bale.

A description of the details of the form shown in the drawings will now be given.

The arch shaped frame 5 has outwardly directed base flanges 14 by which it is securely held in place. The carrier 12 has integral upwardly directed hangers 15 at each side which have their upper ends bifurcated to receive the inner rounded ends of the levers 6, pivotal connections being established by transverse pins 16 passing through the parts as shown in Fig. 3. It is evident that the carrier being free to swing will always maintain a horizontal position irrespective of the angle of the levers and any tendency of the bale to tilt or distort, will be eliminated. Adjacent the frame a portion of a loading platform 17 is shown in position to load a bale onto the carrier when the latter is in its lowermost position, or to remove a bale from the carrier after the bale has been compressed.

The levers 6 and 7 are spaced apart and held in fixed relation by transverse cross rods 18. The shaft 8 is rotatably mounted in the standards 9 and the levers are fastened on the shaft by caps 19 secured to the under sides of said levers which are notched to fit on the shaft. It will be noted that the central lever is terminated at the shaft and is not connected to the carrier as it is employed particularly in connection with the mechanism for raising the free ends of said levers after the bale has been compressed and which mechanism will be hereinafter described. It will be observed that each lever has the greater portion of its length extending outward toward the rack members 10 and 11. The fulcrum point formed by the shaft 8 being located comparatively close to the frame 5, pressure exerted upon the outer or free ends of the levers will be multiplied many times at the carrier, and by lengthening the outward projection of the levers the ratio between the applied pressure and the resultant pressure may be increased.

The free ends 20 of the levers are enlarged and bifurcated to embrace the segmental rack members 10 and 11 which are each curved in an arc having its center coincident with the center of the shaft 8. On the ends 20 of the two side levers 6, jack boxes 21 are fixed, while on the end 20 of the lever 7 a similar box 22 is secured. These boxes have their inner walls contiguous to the inner walls of the bifurcated ends. The outer faces of the segmental racks are provided with ratchet teeth 23, those of side members 10 being opposite to those of the central member 11. The members 10 and 11 are spaced apart and held in fixed relation by a cross bar 24, and are supported and braced by side rods 25 attached to the upper ends of the members 10 and mounted at the base of said members. The said members are further made rigid by strut rods 26 extending from the standards 9 to the upper ends of the members 10.

In each jack box 21 a hand lever 27 is pivoted a short distance from its inner end on a transverse pin 28 mounted in the box as shown in Fig. 2. This lever may project outward from the box any desired distance. On the inner end of each lever 27 a depending dog 29 is pivoted and constantly held in engagement with the teeth 23 by a weighted arm 30 mounted as shown. It is apparent that by swinging the free end of the lever 27 upward, the dog 29 is lowered and being engaged with the teeth 23, when said lever 27 is swung down it will be fulcrumed on the pin 28 and through the agency of the dog, the box and end 20 of the lever 10 will be carried down. In order to hold the box and lever 10 against upward movement when the dog is being lowered to take a free hold upon the teeth, a pawl 31 pivoted between ears 32 on the top of each box 21, is in constant engagement with the teeth 23. To insure the working of the levers in unison, the free ends of the levers 27 are connected by a cross bar 33, as best shown in Fig. 4.

From the foregoing it will be apparent that two men, one working at each lever 27, may work the boxes 21 down the rack members 10 step by step, and thus lower the levers 6 and 7. A bale of cotton being placed on the carrier 12 when the same is in its lowermost position will be efficiently compressed under the frame 5 as the levers are swung and the carrier moved upward. It is understood that mechanical operating means of suitable form may be connected to the levers 27 if desired.

After the free ends of the levers 6 and 7 have been swung down, it is apparent that some means for returning the same to their normal position must be provided. For this purpose a lever 40 is mounted on the box 22, but has its extreme inner end mounted on the pin 48 as shown in Fig. 5. This lever 40 is shorter than the others so as not to interfere with the cross bar 33 connecting the other levers 27. A dog 34 is pivoted on the lever 40 mounted in block 22, outward from the pivot point of said lever and engages the teeth 23 of the member 11 which teeth are opposite to those of the members 10. By swinging the lever 40 down the box 22 and the end 20 of the lever 7 are raised. The parts are retained in their raised position by a pawl 35 held against the teeth by a weighted arm 36. By swinging the lever 40 the levers 6 and 7 may be returned to their positions.

It is obvious that the teeth 23 of the rack member 11 being opposed to the teeth of the rack members 10 and the dogs and pawls associated therewith working in opposite directions, the working of the lever 40 would interfere with the working of the levers 27 and vice versa. To avoid such conflict apertures 37 are provided in the end 20 of the lever 7 and similar apertures 38 are provided in the levers 6. Suitable pins may be inserted in these apertures after the parts have been adjusted as shown in dotted lines in Figs. 2 and 5 and thus the dog and pawl of box 22 may be locked in inoperative position while the dogs and pawls of boxes 21 are free to operate and vice versa.

What I claim is:

1. In a baling compress, the combination of a frame, a carrier disposed in the frame, elongated levers swingingly carrying the carrier, a fulcrum support for the levers from which they extend outward, rack bars disposed at the free ends of the levers, and pawl and lever devices carried by the free ends of the levers and operating on the rack bars.

2. In a baling compress, the combination of a frame, a carrier disposed in the frame, elongated levers swingingly carrying the carrier, a fulcrum support for the levers from which they extend outward, rack bars disposed at the free ends of the levers, and pawl and lever devices carried by the free ends of the levers and operating on the rack bars, said pawl and lever devices being arranged in opposed relation whereby one is constructed for swinging the free ends of the levers upward and the other for swinging said ends downward.

3. In a baling compress, the combination of a frame, a carrier disposed in the frame, elongated levers swingingly carrying the carrier, a fulcrum support for the levers from which they extend outward, boxes mounted on the free ends of the levers, rack bars fixed vertically and received in the boxes, a lever mounted in each box, a dog carried by each lever and engaging the rack bar thereof, and a pawl mounted adjacent each box and engaging the rack bar thereof.

4. In a baling compress, the combination of a frame, a carrier disposed in the frame, elongated levers swingingly carrying the carrier, a fulcrum support for the levers from which they extend outward, boxes mounted on the free ends of the levers, rack bars fixed vertically and received in the boxes, a lever mounted in each box, a dog carried by each lever and engaging the rack bar thereof, and a pawl mounted adjacent each box and engaging the rack bar thereof, the elongated levers having provision for locking the dogs and pawls out of engagement with the rack bars.

5. In a baling compress, the combination of a frame, a carrier disposed in the frame, elongated levers swingingly carrying the carrier, a fulcrum support for the levers from which they extend outward, segmental vertical rack bars fixed in position, the outer ends of the levers being bifurcated and embracing the rack bars, and means mounted on the bifurcated ends of the levers and engaging the rack bars for swinging the free ends of the levers up and down.

6. In a baling compress, the combination of a frame, a carrier disposed in the frame, elongated levers swingingly carrying the carrier, a fulcrum support for the levers from which they extend outward, segmental vertical rack bars fixed in position, the outer ends of the levers being bifurcated and embracing the rack bars, boxes mounted on the bifurcated ends of the levers, pawls associated with the boxes and engaging the rack bars, levers pivoted in the boxes, and dogs pivoted on the levers and engaging the rack bars.

7. In a baling compress, the combination of a frame, a carrier disposed in the frame, elongated levers swingingly carrying the carrier, a fulcrum support for the levers from which they extend outward, segmental vertical rack bars fixed in position, the outer ends of the levers being bifurcated and embracing the rack bars, boxes mounted on the bifurcated ends of the levers, pawls associated with the boxes and engaging the rack bars, levers pivoted in the boxes, dogs pivoted on the levers and engaging the rack bars, and means for connecting some of the box levers in unison.

In testimony whereof I have signed my name to this specification in the presence of two subscribing witnesses.

ISHAM MIKEAL.

Witnesses:
J. B. PONDROM,
L. G. BELEU.

---

Copies of this patent may be obtained for five cents each, by addressing the "Commissioner of Patents, Washington, D. C."